United States Patent Office 3,222,224
Patented Dec. 7, 1965

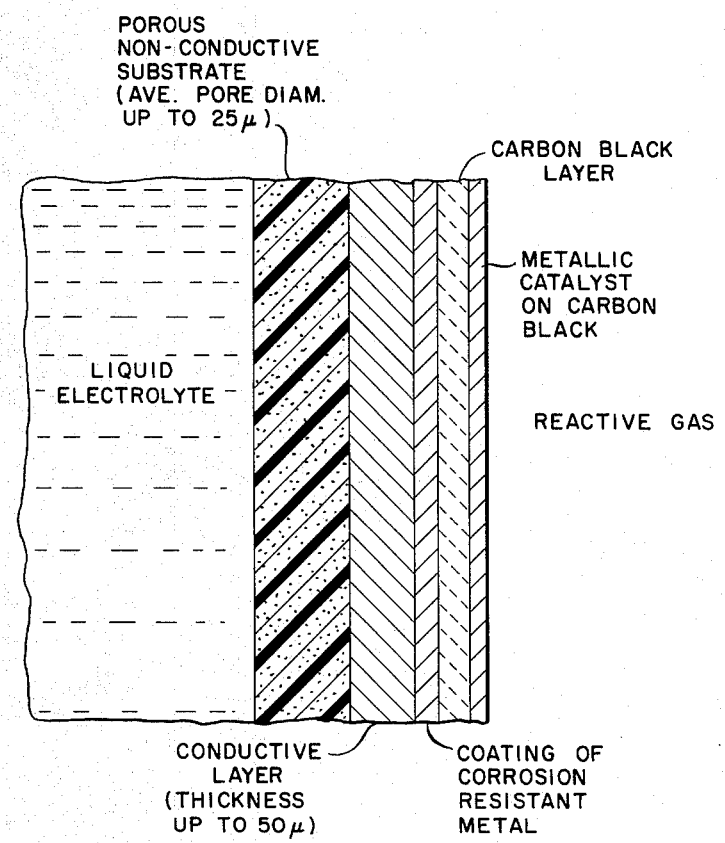

3,222,224
ELECTRODES FOR FUEL CELLS
Keith Rolls Williams, Little Sutton, and Richard Terence Short, Ellesmere Port, England, assignors to Shell Oil Company, New York, N.Y., a corporation of Delaware
Filed May 8, 1962, Ser. No. 193,317
Claims priority, application Great Britain, May 10, 1961, 17,119/61
The portion of the term of the patent subsequent to Dec. 31, 1980, has been disclaimed
9 Claims. (Cl. 136—86)

This invention relates to electrodes which are particularly but not exclusively useful as oxygen electrodes in fuel cells.

According to the present invention, an electrode for use in a fuel cell comprises a porous relatively conductive base having a porous relatively non-conductive substrate with an average pore diameter up to $25\mu$ and a layer of porous relatively conductive material with a thickness up to $50\mu$ applied to the substrate, and carried by this base a layer of carbon black, which may be acid-activated, and preferably having a metallic catalyst deposited in or on the carbon black. The use of carbon black as a support for the catalyst in an electrode of this type has been found to be surprisingly effective in view of the fact that pure carbon black is a non-conductor or a very poor conductor of electricity. The carbon black support has been found to yield electrodes having an adequate useful life and capable of giving increased current output per unit area as compared with other catalysts used for fuel cell electrodes; the use of carbon black also effects considerable economies in producing fuel cell electrodes, compared with previously proposed electrodes using only metal catalysts.

All references herein to "conductive" and derived terms relate to electrical conductivity.

In this specification the term "average pore diameter" refers to a specific propertiy of the substrate, which can be ascertained by measuring the pressure necessary to force air, applied over the surface of the porous substrate, through the pores when the substrate is thoroughly wetted by a suitable liquid. The average pore diameter $d$ is then defined by the equation $d=4T/p$ where $p$ is the pressure in dynes/cm.$^2$ and T is the surface tension of the liquid.

When the electrode of the present invention is provided with a silver catalyst on the carbon black, or only with activated carbon black, it is suitable for use as the oxygen electrode in a fuel cell. When other metallic catalysts (e.g. platinum, palladium, rhodium, ruthenium or iridium) are present or in the carbon black, the electrode may be used as either an oxygen or a hydrogen electrode in a fuel cell.

The accompanying drawing, which is not to scale, shows in fragmentary section an arrangement of component layers which can make up an electrode of the invention and their positions relative to the liquid electrolyte and reactive gas when the electrode is in operative position in a fuel cell. The porous conductive base of the electrode is preferably a layer of silver deposited upon a sheet of porous plastic material, as described in the specification of copending U.S. patent application 34,128, now Patent 3,116,170. The silver layer is preferably provided with a coating of rhodium or gold to provide a higher corrosion resistance. The carbon black is then applied to the plated silver surface by use of an adhesive, the metallic catalyst to be used being preferably mixed with the carbon black before application. As pointed out in said copending application, now U.S. Patent 3,116,170 issued December 31, 1963, the electrodes can be used advantageously in pairs to form a fuel cell with an electrolyte space therebetween and a gaseous fuel cell is suitably constructed with porous electrodes formed by applying a layer of conductive metal by evaporation onto a microporous non-conductive substrate having an average pore diameter of from ¼ to 25 microns and electrodepositng further metal onto said layer to make the total thickness thereof at least 0.03 micron but not greater than twice the average pore diameter of the substrate. The carbon black, preparably containing a metallic catalyst, is then applied on the conductive layer. The microporous substrate will be in contact with the liquid electrolyte in the cell while the fuel gas and oxygen-containing gas used will contact the opposite sides of the respective electrodes. These electrodes will most advantageously have conductive layers which have pores similar to those of the substrate and provide contact between the electrolyte and said gases, there being conductive material on one face only of the substrate in each electrode.

The carbon black may be activated by acid treatment, e.g. by treatment with 10% nitric acid at 100° C. (on a water bath) for 24 hours. Metal catalysts, when used, are preferably deposited on the carbon black which may also, but not necessarily, be activated, by the reduction of suitable salts. Preferably the catalyst is effectively deposited in the carbon layer by using a previously prepared mixture of carbon black and metallic catalyst, for example, a mixture of 10% palladium and "Norit" carbon powder (an activated vegetable charcoal). The metallic catalyst can be deposited on the carbon black after this latter has been applied to the relatively conductive base, e.g. by reduction of suitable metallic salts with formaldehyde, but this procedure is generally too complicated and time-consuming to be worthwhile.

A further feature of the present invention is the provision of a process for making an electrode wherein a suspension or slurry comprising a solvent, e.g. carbon tetrachloride, an adhesive such as bitumen or rubber, and carbon black or a mixture of carbon black and a metallic catalyst is sprayed onto a porous conductive base having a porous relatively non-conductive substrate with an average pore diameter up to $25\mu$ and a layer of porous relatively conductive material with a thickness up to $50\mu$ applied to the substrate, and thereafter causing or allowing the solvent to evaporate, the base being preferably maintained at an elevated temperature before, during and after spraying. If desired, polystyrene may be used as an adhesive for holding the carbon black on to the porous conductive base. In this event it is convenient to spray the carbon black in an aqueous emulsion of polystyrene onto the porous conductive base, allow it to dry and then to spray the resulting carbon black/polystyrene layer with a small amount of solvent, e.g. benzene, to render the polystyrene tacky and thereby cause it to adhere to the porous conductive base.

The present invention is further illustrated by reference to the following specific examples:

*Example 1*

Microporous polyvinyl chloride sheet sold under the trade name "Porvic Grade M," was coated with evaporated silver and then electroplated to give a porous deposit of silver having an approximate thickness of 1.5 microns. Immediately after plating the electrode was soaked for 10 minutes in a 5% solution of sulphuric acid and then plated with rhodium by using a commercial rhodium plating solution at a current of 20 milliamps/cm.$^2$ for a period of 2.5 minutes. This provided a layer of rhodium on the silver having an average thickness of 0.1 to 0.2 micron.

An adhesive constituted by a substance as indicated in the table given below was dissolved in carbon tetrachloride and carbon black having incorporated therewith metallic catalyst was mixed with this solution to give the required carbon to adhesive ratio. The amount of carbon tetrachloride used was such as to render the carbon/adhesive mixture sufficiently liquid to be sprayed. This mixture was then sprayed onto the electrode prepared as just described, and during this operation the electrode was heated to a temperature of approximately 40° C. by means of an infra-red lamp. After the electrode had been evenly covered with the carbon/adhesive mixture, it was left to dry in air at about 40° C. The final thickness of the spray-applied coating varied between 1 and 5 grams of solids/square foot.

The rubber used as an adhesive was "Cow" gum, a solution of natural rubber in petroleum spirit. Other rubbery materials may be used as an adhesive, e.g. chlorinated rubber such as that sold as "Alloprene B."

| Electrode | Electrolyte | Conductive Layer on Substrate | Catalyst | Adhesive | Adhesive/Carbon | Solvent | C.D.ma/cm² at 0.5 v. From Cell |
|---|---|---|---|---|---|---|---|
| 1 | KOH | Silver | Carbolac | Rubber | 1/10 | CCl₄ | 34 |
| 2 | KOH | do | Unpurified Carbolac | do | 1/10 | CCl₄ | 25 |
| 3 | KOH | do | 10% Pd/Carbon | do | 1/10 | CCl₄ | 40 |
| 4 | KOH | do | 10% Pd/Carbon | Bitumen | 1/10 | CCl₄ | 60 |
| 5 | KOH | do | 1% Pd/Carbon | Rubber | 1/10 | CCl₄ | 34 |
| 6 | KOH | do | 5% Rh/Carbon | do | 1/10 | CCl₄ | 34 |
| 7 | KOH | do | 5% Ru/Carbon | do | 1/10 | CCl₄ | 34 |
| 8 | KOH | do | 5% Pd/Carbon | do | 1/10 | CCl₄ | 38 |
| 9 | KOH | do | 5% Pt/Carbon | do | 1/10 | CCl₄ | 32 |
| 10 | KOH | Silver/Rhodium | 10% Pd/Carbon | Bitumen | 1/10 | CCl₄ | 80 |
| 11 | KOH | Silver/Nickel | 10% Pd/Carbon | do | 1/10 | CCl₅ | 34 |
| 12 | H₃SO₄ | Gold on Pd/Au evap. Porvic. | 5% Au 15% Pt/Carbon | do | 1/10 | CCl₄ | 44 |
| 13 | K₂CO₃ | Silver | 10% Pd/Carbon | do | 1/10 | CCl₄ | 9 |
| 14 | KOH | do | (No catalyst) | | | | 1 |
| 15 | KOH | Silver on | 3 gms per sq. ft. Pd black electrolytically deposited | | | | 60 |
| 16 | KOH | Silver | 10% Pd/Carbon .5 gm Pd per sq. ft | Rubber | 1/10 | CCl₄ | 60 |

Electrode 10 was run against a similar electrode fed with hydrogen. This electrode gave good results as a hydrogen electrode
Electrode 14 had the same base as the other silver electrodes, but no catalyst (other than the catalytic effect of the porous silver layer); it is included for comparative purposes.
It will be noted that electrode 16, prepared in accordance with the present invention gave the same output as electrode 15 (included for comparative purposes and having no carbon black layer) with ⅙ of the amount of palladium catalyst.

*Example 2*

Example 1 was repeated with the exception that a nickel coating was applied to the silver electrode in place of rhodium. The nickel was deposited from a nickel plating bath consisting of:

|  | G./liter |
|---|---|
| Nickel sulphate | 200 |
| Ammonium chloride | 20 |
| Boric acid | 25 |

The current density was 25 amps/square foot and the plating time was 1 minute. This gave a nickel coating of approximately 0.4 micron thickness. Electrodes prepared in accordance with Examples 1 and 2 are suitable for alkaline electrolyte.

*Example 3*

An electrode was prepared as described in Example 1 except that a vacuum deposited palladium-gold alloy (Pd 60%, Au 40%) which was thickened with a gold layer applied from a commercial cyanide bath (5 minutes at 25 ma./sq. in.) was used in place of silver to provide the porous conductive layer which had a thickness of 1 micron. Electrodes of this type are suitable for use in acid electrolytes.

The following table gives the current obtained from fuel cells formed by employing an electrode prepared in accordance with the present invention and made in accordance with one of the specific examples, which is supplied with gaseous oxygen, and a palladium black electrode supplied with gaseous hydrogen, the temperature being 25° C. and the gas pressure 2 lbs./sq. in. as described in the specification of copending application No. 34,128.

The bitumen used as an adhesive was a blown bitumen derived from a Venezuelan crude oil and had a penetration of 25 decimillimeters and a softening point of 85° C.

It will be appreciated that the layer of porous relatively conductive material of the electrode of the present invention may be made entirely of a more oxidation-resistant metal such as rhodium or gold, and that this arrangement of the electrode is generally excluded in practice by reason only of the additional cost involved; nickel, if used alone as the layer of porous relatively conductive material, is advantageous since it is less conductive and less ductile than silver.

We claim as our invention:

1. An electrode for use in a fuel cell, said electrode comprising: a base composed of porous non-conductive plastic material having pores of average diameters of from ¼ to 25µ with a porous electrically conductive metal layer thereon having a thickness of from 0.03 to 50µ and a layer of carbon black carried by said base and in contact with said conductive layer, the said pores providing passageways whereby electrolyte in contact with the plastic material can pass through said plastic material and the said layers thereon and contact gas from the other side of the electrode in the carbon black layer.

2. An electrode according to claim 1 wherein the said carbon black is carbon black activated by treatment with nitric acid solution and has associated therewith about 1 to about 10% w. of metallic catalyst of the group consisting of palladium, ruthenium and platinum.

3. An electrode according to claim 2 wherein the catalyst is deposited in the carbon layer by using a mixture of carbon black and metallic catalyst.

4. An electrode according to claim 1 comprising: as the conductive base a layer of silver deposited upon a sheet of microporous polyvinylchloride.

5. An electrode according to claim 4 comprising a layer of a metal selected from the class consisting of rhodium and gold, said metal being deposited on the silver layer.

6. An electrode according to claim 4 wherein the silver layer has a thickness not greater than twice the average diameter of the pores of the polyvinyl chloride sheet.

7. A process for making an electrode wherein a mixture comprising an adhesive, a solvent therefor and carbon black is sprayed onto a porous electrically conductive metal layer of thickness 0.03 to 50 microns carried on one face of a porous plastic sheet having pores of average diameter ¼ to 25 microns, and thereafter the solvent is evaporated from the mixture thereby deposited leaving an adherent layer of carbon black on the metal layer.

8. A process according to claim 7 wherein the mixture which is sprayed contains a metallic catalyst of the group consisting of palladium, ruthenium and platinum in an amount of about 1 to about 10% w. of the carbon black.

9. A fuel cell adapted to produce electricity from gaseous hydrogen and an oxidizing gas which comprises at least two improved electrodes having an aqueous electrolyte therebetween one of said electrodes being in contact the hydrogen and the other with the oxidizing gas on their sides opposite from the electrolyte, each of said electrodes comprising a porous sheet of non-conductive plastic material having pores with an average diameter of ¼ to 25 microns which sheet carries on the face opposite the electrolyte side a porous layer of conductive metal with a thickness of at least 0.03 micron but not greater than twice the average pore diameter of the plastic sheet on which porous metal is a layer of carbon black, the pores in said plastic sheet communicating with pores in the metal layer so electrolyte passes therethrough into contact with said gases in the presence of said carbon black, the electrode in contact with the hydrogen having admixed with its said carbon black a metallic catalyst of the group consisting of palladium, ruthenium and platinum in an amount of about 1 to about 10% w. of the carbon black.

References Cited by the Examiner

UNITED STATES PATENTS

| | | | |
|---|---|---|---|
| 409,365 | 8/1889 | Mond et al. | 136—86 |
| 2,384,463 | 9/1945 | Gunn et al. | 136—86 |
| 2,708,683 | 5/1955 | Eisen. | |
| 2,860,175 | 11/1958 | Justi | 136—120 |
| 2,947,797 | 8/1960 | Justi et al. | 136—20 |
| 3,116,170 | 12/1963 | Williams et al. | 136—120 |

FOREIGN PATENTS

| | | |
|---|---|---|
| 830,922 | 3/1960 | Great Britain. |
| 60,901 | 8/1954 | France. |
| | | (Addition to No. 3,116,170) |
| 1,127,786 | 8/1956 | France. |

JOHN H. MACK, *Primary Examiner.*